United States Patent

[11] 3,576,285

[72] Inventor Roger Muller
Neuilly Sur Seine, France
[21] Appl. No. 739,762
[22] Filed June 25, 1968
[45] Patented Apr. 27, 1971
[73] Assignee Etablissement D.F.
Paris, France
[32] Priority Aug. 3, 1967
[33] Germany
[31] P 16 02 509.5

[54] APPARATUS FOR A SETTABLE WORKING MATERIAL FEED IN PRESSES IN FORM OF CYCLES
4 Claims, 3 Drawing Figs.

[52] U.S. Cl. .................................................. 226/141
[51] Int. Cl. .................................................. B65h 17/22
[50] Field of Search .......................................... 226/188, 141, 137, 142, 139; 74/325

[56] References Cited
UNITED STATES PATENTS

| | | | |
|---|---|---|---|
| 2,314,411 | 3/1943 | Lyon ............................ | 226/137X |
| 3,358,525 | 12/1967 | Clarke .......................... | 74/325X |
| 3,449,979 | 6/1969 | Fischer ......................... | 74/325X |

*Primary Examiner*—Allen N. Knowles
*Attorney*—Ernest G. Montague

ABSTRACT: An apparatus for a settable working material feed in presses in cycle form having feed rollers driven by a press by means of a step-by-step member, which includes a change gear drive, means for a rough setting step for a basic feed, and means for a correction- or fine-setting step. Two feed rollers are also provided and the step-by-step member is operatively connected with the means for the rough setting step-by-step means of the change gear drive. The step-by-step member is operatively connected with the feed rollers by means of the means for a correction- or fine-setting step.

Inventor:
Roger Müller
By ...... Montague
Attorney

APPARATUS FOR A SETTABLE WORKING MATERIAL FEED IN PRESSES IN FORM OF CYCLES

The present invention relates to an apparatus for the settable working material feed in presses in form of cycles with feeding drums driven by the press stepwise by means of a step-by-step feeding device, which feeding drums grip the working material by means of clamping.

In addition to the above-mentioned drum feed, for advancing of the working material in presses, also the so-called gripper feed system is known, in which the belt working material is gripped, moved and released by tonguelike members, and is gripped again upon a return stroke of the tongues. This type of working material feed does not permit great working speeds.

During the drum feed the working material is gripped between two rollers. In a known apparatus for feeding the working material in presses, the feeding rollers are stepwise rotated by means of overrunning clutches. Also this known apparatus is not usable in connection with high working speeds, because the overrunning clutches are no more in a position to absorb the occurring mass forces without fault. An exact, accurate working material feed is not assured in apparatus equipped with overrunning clutches.

High working speeds and an exact working material feed are assured by an apparatus for settable working material advance in presses performing in cycles, which are designed in the first-mentioned manner. In this known apparatus, a step-by-step member known to the man skilled in the art as a "Ferguson" drive transforms the continuous rotary movement, which derives from the press, into a stepwise rotary movement, whereby, depending upon the design of the step-by-step advancing member and the "Ferguson" drive, respectively, for each press stroke one-sixth- or one-eighth rotation of the takeoff shaft of the "Ferguson" drive is produced. In the known device for the cyclelike, settable working material advance, the feed rollers are connected directly with the output side of the step-by-step advancing member. For the change and adjustment, respectively, of the size of the feeding path, in this apparatus a change of the feeding rollers is provided. For each feeding path to be determined also a corresponding set of feeding rollers is required.

The drawback of this known apparatus resides, among others, in the fact that the size of the advance can be adjusted only in very coarse steps. In spite of the fact that the steps are held relatively large, however, for gripping a wide setting range, a great number of different feeding rollers is required. Thereby, high costs result, since the feeding rollers must be produced with high precision for obtaining a great working exactness, and beyond that must have a hard metal face, in order to protect the running faces, which effect the working material, form quick wear. Corrections of a set advance, which can be required, for instance, in order to equalize tolerances of the working material, which is worked from the press, cannot be provided in the known apparatus. In the practice, these drawbacks of the known apparatus lead to the result that one can not always operate with the desired exploitation of the band working material.

It is one object of the present invention to provide an apparatus for a settable working material feed in presses in form of cycles, wherein the described drawbacks of the above mentioned apparatus are avoided, and wherein the apparatus is designed such that it renders possible, with a simple, particularly cost-saving structure, a fine step setting of the advance value.

It is another object of the present invention to provide an apparatus for a settable working material feed in presses in form of cycles, wherein the above-described apparatus in accordance with the present invention is characterized by the fact that the step-by-step advancing member is connected with the rollers by means of a change gear drive with a rough adjustment step for the basic feed and a further fine adjustment step for the correction feed.

In case of a new design of the apparatus, by the use of a change gear drive an appreciable cost reduction is brought about, since for gripping of a great feeding range, it can now be neglected, to keep in stock a corresponding larger set of advancing rollers of different size, which feeding rollers are relatively expensive by the required precision of the manufacture and the necessary hard metal layer. By a corresponding large set of change gears, having a different number of teeth, nearly any selected number of fine-step settable advancing path can be realized with a small expenditure. The division of the change gear drive into a rough setting step for the basic feed and in a fine setting step for the correction advance renders possible for the first time to set the normally provided base feed on the one change gear step and the errors resulting from working material tolerances to compensate by corresponding adjustment of the correction—or fine setting step. Thus, by simple means a very exact setting of the advance can be performed and the working material advance, originated or effected by the apparatus is performed with a great exactness. The setting and working exactness of the apparatus designed in accordance with the present invention is of the order of one-hundredth of a millimeter and working speeds and advance speeds, respectively, of 60 m./min. can be realized.

In case of a suitable design of the apparatus of the present invention, the change gear drive is equipped with a rotary direction reversal gear or a rotary direction reversal gear set, serving the selection of the feeding direction as well as the diameter adjustment of the fine setting step.

The apparatus designed in accordance with the present invention is furthermore characterized by the formation of an attached device, selectively used on the input side usable on the press preferably securable on the press and preferably capable of swinging out.

Finally, in a further embodiment of the present invention, it is also provided that in the advancing rollers are either liftable from each other controlled independently of the working cycle by means of a lifting device selectively within the working cycle of the press, or remain upon stopping of the lifting device in their clamping position.

With these and other objects in view which will become apparent in the following detailed description, the present invention will be clearly understood in connection with the accompanying drawings, in which.

Figure 1:
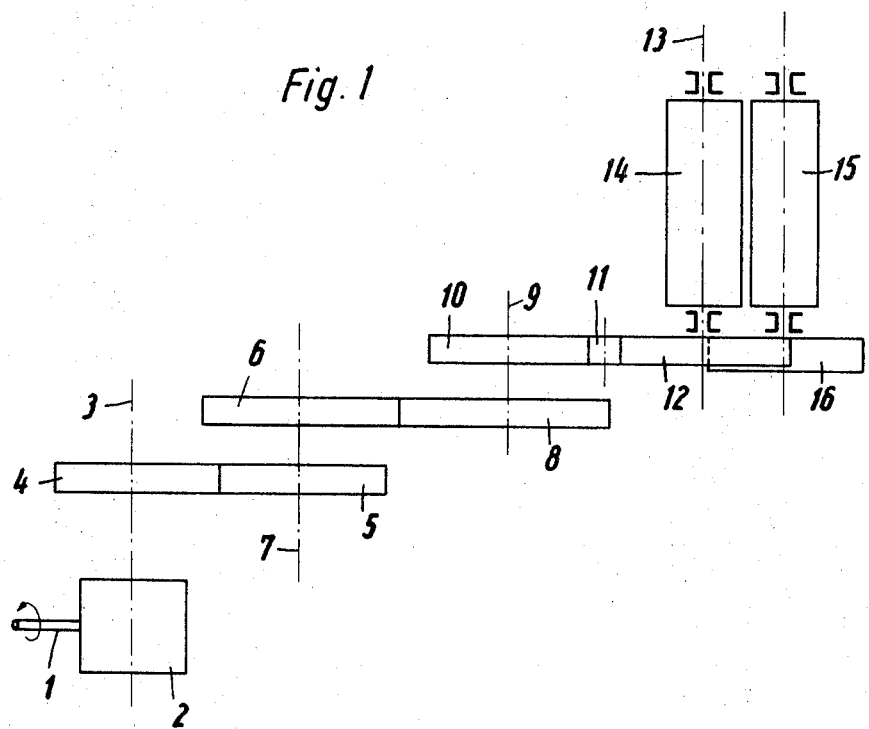
FIG. 1 is a schematic drive plan of the apparatus designed in accordance with the present invention.

Referring now to the drawings, the drive plan of the apparatus for settable working material advance in presses performed in a cycle, which is shown in FIG. 1, indicates the flow of the forces. The apparatus is driven by the press, preferably, from its crank shaft. The continuous rotary movement of the crank shaft is fed to the drive shaft 1 of a step-by-step advancing member 2, which is known to the man skilled in the art under the name of a "Ferguson-drive." From this continuous rotary movement by the step-by-step advancing member 2 a plurality of impulselike successive rotary steps of an output shaft 3 is produced. On the drive shaft 3 is secured a toothed gear 4, which meshes with a toothed gear 5 which, in turn, is received on a common shaft 7 with another toothed gear 6. The toothed gear 5 and the toothed gear 6 are connected nonrotatably with each other. The toothed gear 6 meshes with another toothed gear 8, which is connected by means of a shaft nonrotatably with a gear 10 which, in turn, meshes by means of an intermediate toothed gear 11 or an intermediate toothed gear set with a toothed gear 12, which is received directly on a shaft 13, over which advance drum 14 is driven. The advance drum 14 cooperates with a counter feed roller 15, which is connected operatively by means of toothed gears 16 with the advancing roller 14.

The toothed gears between the step-by-step advancing member 2 and the feeding rollers 14 and 15, respectively, form a change gear drive which makes it possible, with maintaining constant the diameter of the advancing roller 14, which has to be considered as a directly driven advance roller, to set different advances. The toothed gears 4, 5, 6 and 8 form thereby a rough setting step for the basic step of the feed, the means that any required advance path is set by a corresponding selection of these four change gears. It is to be remarked, thereby, that the toothed gear 8 remains generally constant and is not exchanged.

The toothed gears 10 and 12 form a correction or fine setting step of the change gear drive and permit to correct the advancing path selected in the base or rough setting step, whereby setting fine points can be realized which, related to the feed path, are disposed of the order of one-hundredth mm. Correction or fine setting can be required for several reasons. One reason is, for instance, the operation-caused use of the feed rollers, in particular of the feed roller 14, which cannot be avoided by means of a hard metal engagement face, and which leads upon run of time to a diameter reduction. Due to this diameter reduction of the feed roller 14, the actual advancing path becomes smaller than the advancing path set in the rough- or base-advance setting step. A corresponding change of the two change gears 10 and 12 permits now to set again the advancing path to its right size which has become too small due to roller wear. Another example for the necessity of a correction- or fine-setting step results mainly also in case of high feed speeds and working speeds of the press, respectively. In case of high speeds, the advance path performed by the working material is inclined to become larger than it corresponds with the setting in the base- or rough-setting step. By corresponding selection of the change gears 10 and 12, the error can now be obviated and the feed can be exactly set to the desired value.

The toothed gear or the intermediate gear set 11 provided between the change gears 10 and 12 is a reverse gear and reverse gear set reversing the direction of rotation, respectively, for the direction of rotation, which serves simultaneously as equalization gear and gear set, respectively, in case of diameter variations of the change gears 10 and 12. The necessity of this toothed gear results from the requirement for a many-sided usable formation of the apparatus, so that the feed direction can be adjusted to the prevailing requirements. The apparatus is designed as an attached device and can be secured selectively on the input- or the output-side of the press releasably and settable as to its height. The toothed gear 16 shown in FIG. 1 in the drive plan, between the feed roller 14 and the feed roller 15 stands for a plurality of several toothed gears 16a, b, c and d (FIGS. 2 and 3) which becomes required, in order to maintain the operational connection of the two feed rollers 14 and 15, even then, when the feed roller 15 lifts within the cycle of the machine from the feed roller 14. This lifting or raising of the feed roller 15 becomes desirable for operations in which the tools of the press are equipped with catching- or centering-pins which cause small correction displacements of the working material.

Figure 2:
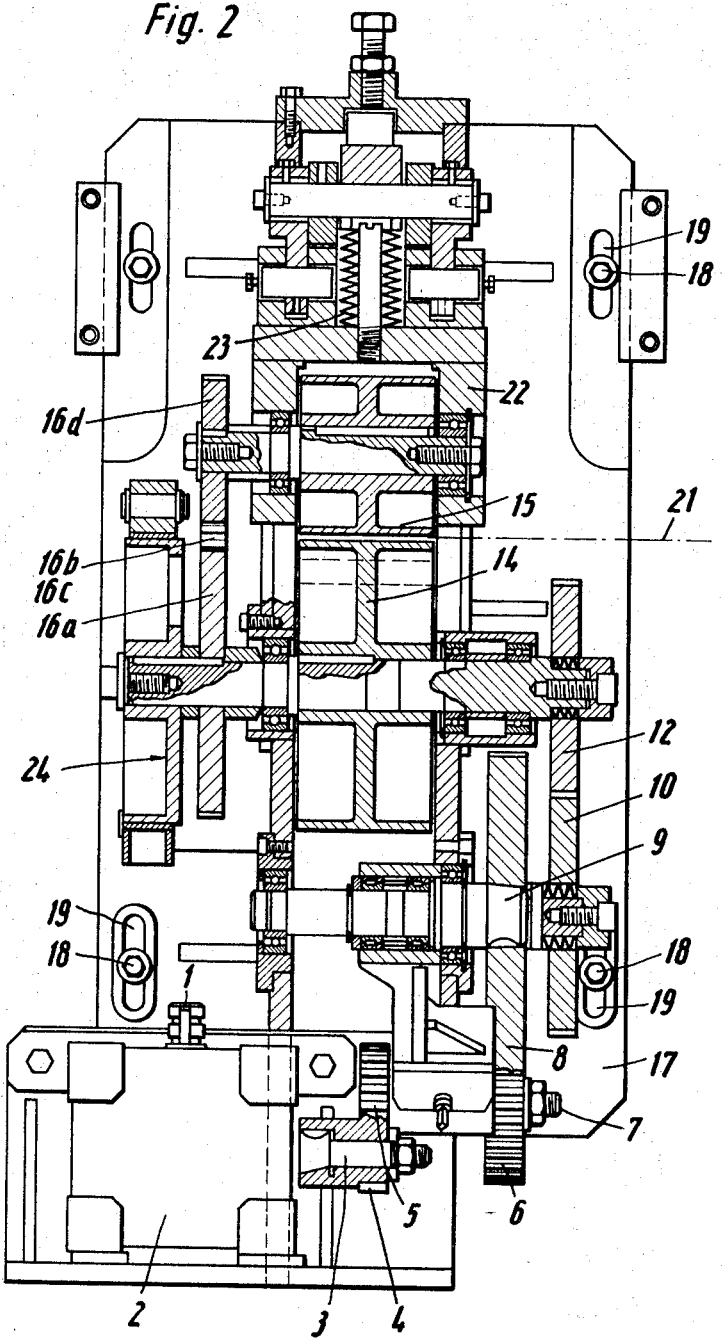
FIG. 2 is a front elevation of the apparatus partly in section.
Figure 3:
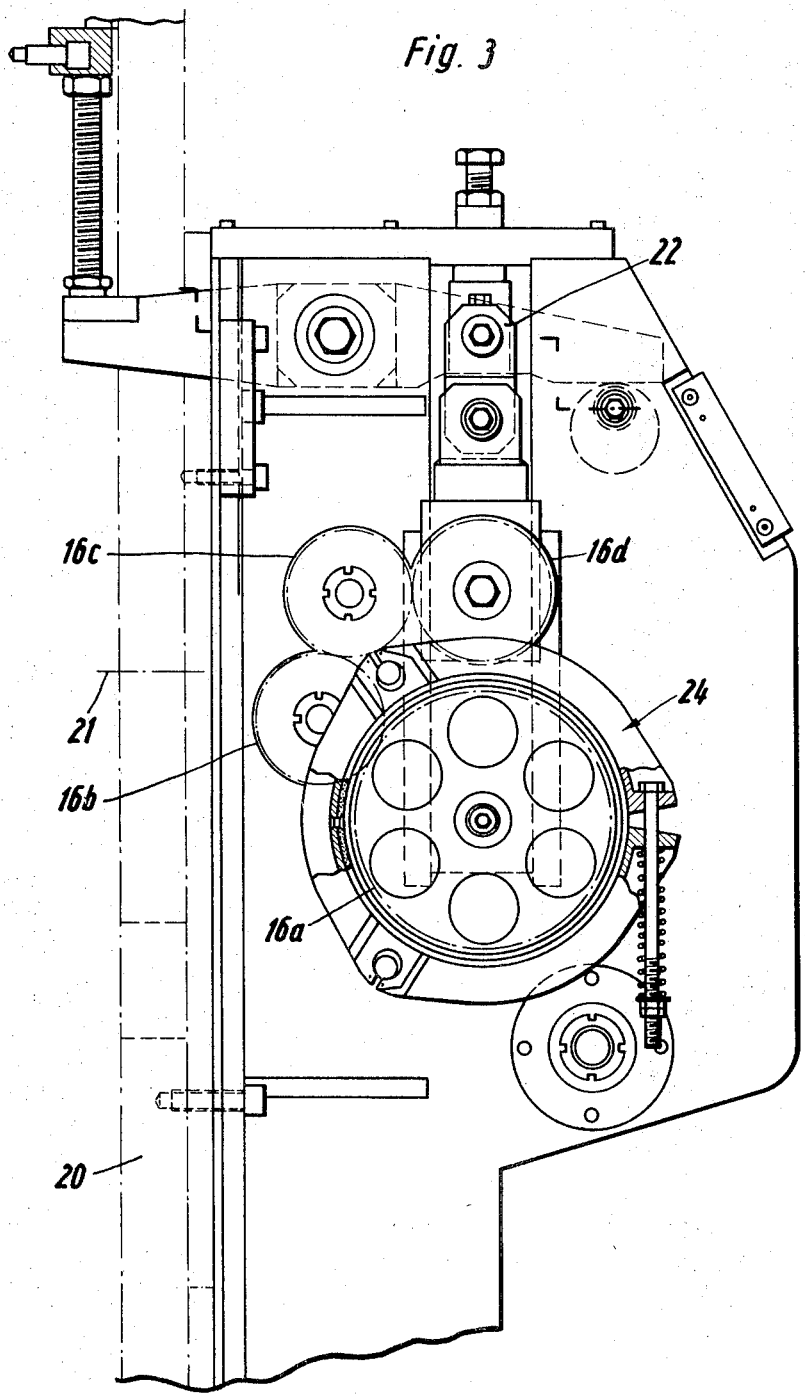
FIG. 3 is a side elevation of the apparatus.

The numerals applied in FIG. 1 are also applied in FIGS. 2 and 3 for the same elements of the apparatus. It can be seen, however, that the apparatus includes a housing or a base plate 17 which can be attached to a press 20 (see FIG. 3) by means of screw bolts 18 which project through longitudinal slot 19. The attachment can be applied, as set forth above, selectively either on the input side or the output side of the press. The longitudinal slots 19 permit to displace the press as to height, until a working material band 21 is aligned exactly at the height of the tools of the press. Preferably, between the press and the base plate 17, links are provided which permit a lateral swinging out of the entire apparatus.

Referring now to FIG. 2, it can be recognized that the shafts 7 and 9 for the change gears are mounted on eccentrics or double eccentrics and have displaceable bearings, respectively, in order to render possible a balancing of the axle distance occurring upon variations of the change gears and to avoid tooth play.

FIG. 2 also permits recognition that the feed roller 15 is mounted in cheeks 22 which are displaceable as to their height, which cheeks 22 are pressed in the direction to the feed roller 14 under the effect of a spring set 23. In the interest of multiple versatility a lifting device (not shown) is also provided. It permits to retain the feeding roller 15 either constant in clamping position with the roller 14 or to lift the same against the effects of the springs 23 in the working cycle or also independently from the working cycle of the press controlled by the roller 14 and the working material band 21, respectively, with releasing of the clamping action. In order to avoid that the feeding roller 14 performs under the influence of the mass forces in case of high feeding speeds and high lifting numbers of the press performs larger rotary steps as provided, it is equipped with a brake 24 which is rendered operative and inoperative, respectively, within the cycle of the operation of the press.

I claim:

1. An apparatus for a settable working material feed in presses in cycle form having feed rollers driven by a press by means of a step-by-step member, which includes:
   a change gear drive,
   means for a rough setting step to selectively set the amount of a basic feed and comprising changeable gears,
   means for a correction- or fine-setting step to correct for wear and/or tolerance variations and/or fine adjustment in addition to said basic feed,
   two feed rollers,
   said step-by-step member being connected with said means for said rough setting step by means of said change gear drive, and
   said means for said rough setting step being operatively connected with said feed rollers by means of said means for a correction- or fine-setting step.

2. An apparatus for a settable working material feed in presses in cycle form having feed rollers driven by a press by means of a step-by-step member, which includes:
   a change gear drive,
   means for a rough setting step for a basic feed,
   means for a correction- or fine-setting step,
   two feed rollers,
   said step-by-step member being operatively connected with said means for said rough setting step by means of said change gear drive,
   said step-by-step member being operatively connected with said feed rollers by means of said means for a correction- or fine-setting step, and
   said change gear drive includes one of a rotary direction reversal gear and a rotary direction reversal gear set serving the election of the feeding direction as well as the adjustment of the diameter of said fine setting step.

3. An apparatus for a settable working material feed in presses in cycle form having feed rollers driven by a press by means of a step-by-step member, which includes:
   a change gear drive,
   means for a rough setting step for a basic feed,
   means for a correction- or fine-setting step,
   two feed rollers,
   said step-by-step member being operatively connected with said rough setting step by means of said change gear drive,
   said step-by-step member being operatively connected with said feed rollers by means of said means for a correction- or fine-setting step, and
   an annexed device swingably secured to said press and selectively usable on the input side or on the output side.

4. An apparatus for a settable working material feed in presses in cycle form having feed rollers driven by a press by means of a step-by-step member, which includes:
   a change gear drive,
   means for a rough setting step for a basic feed,
   means for a correction- or fine-setting step,
   two feed rollers,
   said step-by-step member being operatively connected with said means for said rough setting step by means of said change gear drive, Said step-by-step member being operatively connected with said feed rollers by means of said means for a correction- or fine-setting step, and
a lifting device for said feed rollers, and means for selectively lifting said feed rollers controlled independently from said cycle of operation from each other by means of said lifting device within the cycle of the operation of said press or for remaining in their clamping position upon resting of said lifting device.